April 10, 1962  M. D. CLARK ET AL  3,028,959
METHODS OF AND APPARATUS FOR TESTING AND
ASSORTING ELECTRICAL COMPONENTS
Filed March 9, 1959  2 Sheets-Sheet 2

INVENTORS.
MARION D. CLARK
ROBERT C. WARD
BY
C. B. Hamilton
ATTORNEY

United States Patent Office

3,028,959
Patented Apr. 10, 1962

3,028,959
METHODS OF AND APPARATUS FOR TESTING AND ASSORTING ELECTRICAL COMPONENTS
Marion D. Clark and Robert C. Ward, Winston-Salem, N.C., assignors to Western Electric Company, Incorporated, New York, N.Y., a corporation of New York
Filed Mar. 9, 1959, Ser. No. 798,044
10 Claims. (Cl. 209—81)

This invention relates to methods of and apparatus for testing and assorting electrical components and more particularly to methods of and apparatus for testing and assorting deposited carbon resistors according to resistance values.

In production line methods of manufacturing electrical components, it is necessary to test certain characteristics of such components at various times during the manufacturing process. This testing should be done in such a manner that the continuity of flow in the manufacturing process will not be interrupted. However, limitations inherent in existing testing equipment has heretofore precluded such an uninterrupted flow in the production line.

It is, therefore, an object of this invention to provide new and improved methods of and apparatus for testing and assorting electrical components.

Another object of the invention is to provide new and improved methods of and apparatus for testing and assorting electrical components on the basis of electrical characteristics.

A further object of the invention is to provide new and improved methods of and apparatus for testing and assorting electrical components on the basis of electrical resistivity.

A method illustrating certain features of the invention may include the steps of positioning an electrical resistor for testing, and moving testing electrodes into engagement with the body of the resistor whereupon electrical current is conducted to the electrodes and the resistance value thus determined is transmitted to a computer. Subsequently, a multiposition outlet is indexed by the computer in response to the resistance value previously transmitted thereto and the resistor is then passed through the outlet selected.

Apparatus illustrating certain features of the invention may include two pairs of electrical probes, one pair being arranged in a constant current supply circuit, the other pair being a part of a voltage drop determining circuit. A computer is provided for reading the voltage drop and for indexing a multiposition outlet member through which the previously tested resistor is selectively passed.

A complete understanding of the invention may be had from the following detailed description of a specific embodiment thereof when read in conjunction with the appended drawings in which.

Figure 1:
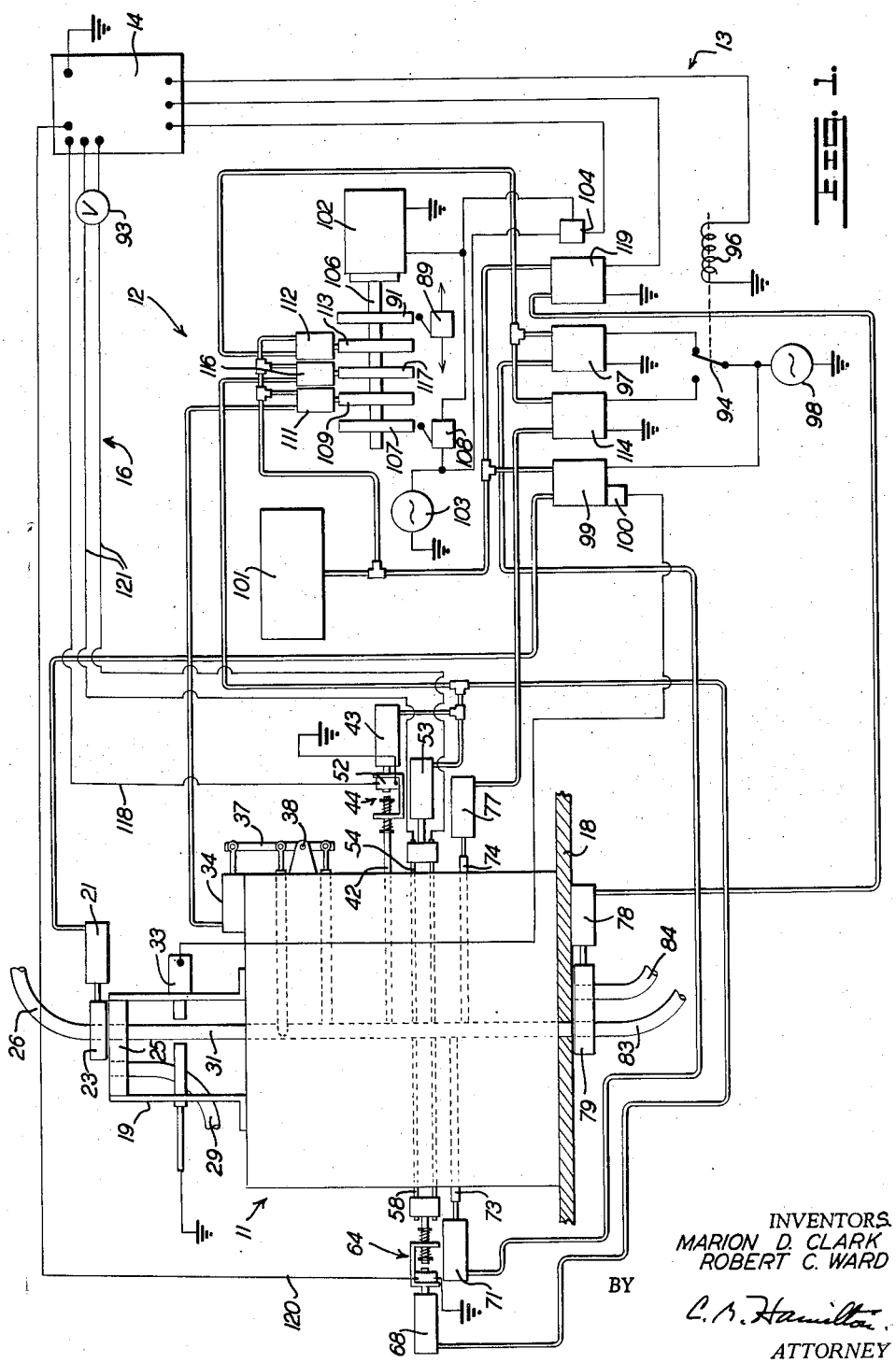
FIG. 1 is a diagrammatic view of a preferred embodiment of the invention.

Referring now to the drawings wherein like reference characters designate like or corresponding parts throughout the several views, there is shown in FIG. 1 a resistance testing device 11, the elements of which are controlled by means of hydraulic controls 12 and electrical control circuitry 13. The electrical control circuitry 13 is controlled by a computer 14 which receives information concerning the resistor 15 (FIG. 2) being tested from the testing device 11 by means of feed circuitry 16. As will be well understood by those skilled in the art to which the invention pertains, computer 14 may be any general purpose, digital computer which is capable of receiving signals and, accordingly, utilizing the signals to effectuate the selective completion of various output circuits. Many types of computers and devices are available for accomplishing these results. By way of example, applicants have successfully employed a computer designated "LPG-30," produced and so designated by the Royal McBee Corporation, and having a magnetic drum information storage.

Figure 2:
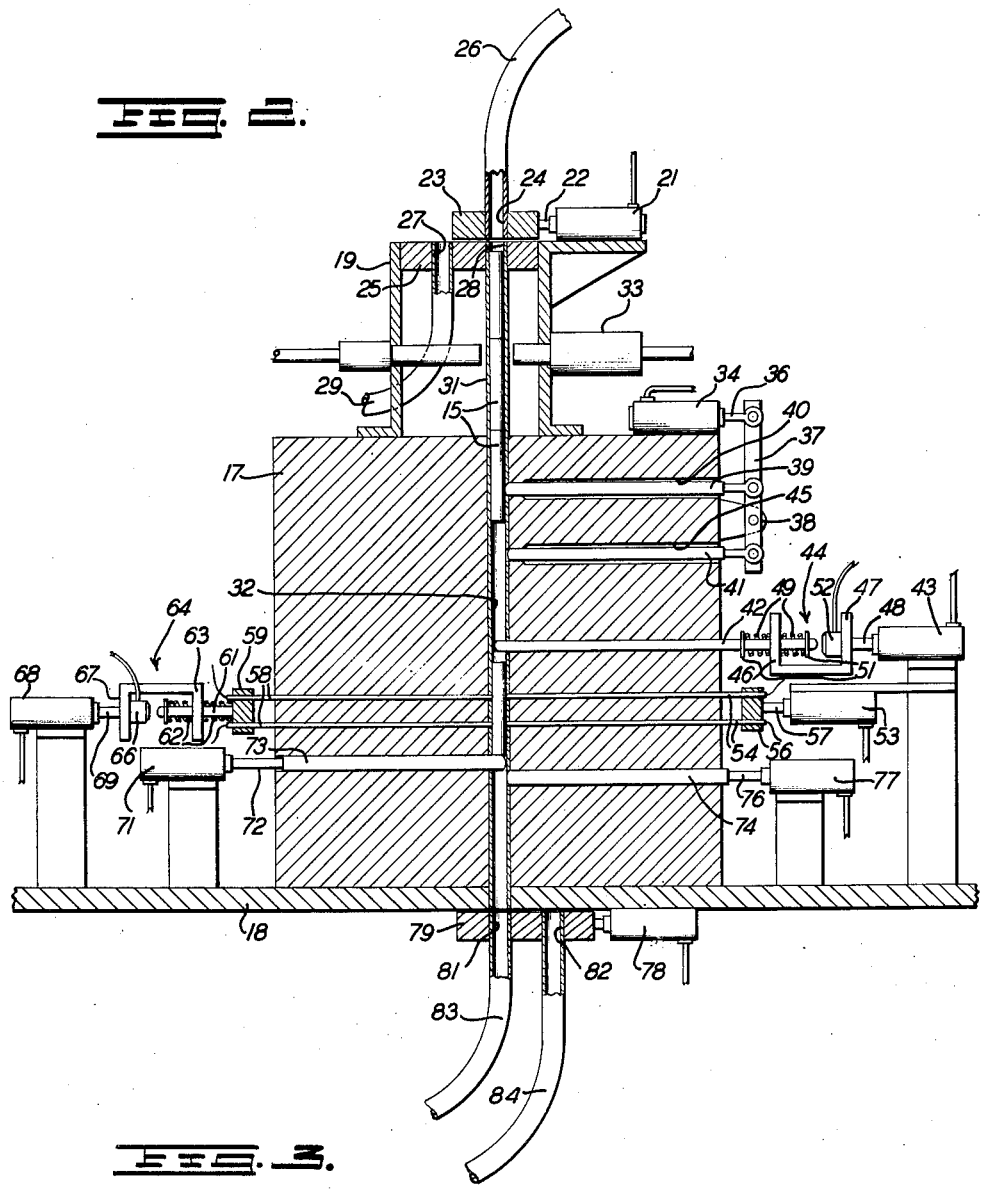
FIG. 2 is a detailed view partly in section and partly in elevation of a portion of the apparatus shown in diagram in FIG. 1.

More specifically, as shown in FIG. 2, the resistance testing device 11 comprises a substantially cubic block 17 of non-conducting material, such as plastic, which is mounted on a base 18. Located on top of the block 17 is a support member 19 to which is attached a horizontally actuated air cylinder 21 which controls a push rod 22 rigidly attached to a slidable block 23 having an aperture 24 therein. A flexible resistor supply tube 26 is fixed at one end in the aperture 24, and the other end thereof is connected to a resistor supply source (not shown). Immediately below the sliding block 23 and forming a portion of the support member 19 is a horizontal member 25 having vertical apertures 27 and 28 extending therethrough. Within the aperture 27 is mounted a flexible overflow tube 29 which may lead to a container (not shown). Immediately to the right of the overflow tube 29 and secured at one end within the aperture 28 is a vertical transparent non-conducting chute or tube 31, the other end of which is received within a vertical aperture 32 within the plastic block 17. A resistor sensing means such as a photoelectric tube 33 is positioned on the support member 19 so that the beam thereof will pass through the transparent tube 31 to detect the presence of an over supply of resistors therein and index the block 23 above the overflow tube 29 when such condition occurs.

Situated upon the top of the plastic block 17 and rigidly attached thereto is a pneumatic cylinder 34 having a piston rod 36 pivotally connected to a vertically extending member 37 designed to pivot about a pin 38 fixed to the side of the block 17. Situated on either side of the pin 38 and pivotally attached to the member 37 are a pair of horizontal rods 39 and 41 which slidably extend through apertures 40 and 45 formed within the block 17, and upon rocking of the member 37 about pin 38 by reciprocation of piston rod 35, the rods 39 and 41 alternately slide within apertures 40 and 45. The tips of the rods 39 and 41 extend through the wall of the tube 31 into the interior thereof a limited amount to releasably engage and hold a resistor 15 therein. Below the horizontal member 41 and in the same vertical plane therewith is a reciprocal probe 42, the end of which is also moved into and out of the vertical tube 31 by a hydraulic cylinder 43.

A U-shaped yoke member 44, an arm 46 of which is in slidable engagement with the reciprocal probe 42 and another arm 47 of which is rigidly attached to a piston rod 48 of the air cylinder 43, is provided for transmission of motion from the air cylinder 43 to the probe 42. Concentrically mounted upon the probe 42 on either side of the arm 46 of the yoke 44 is a pair of spiral springs 49 which are held against the arm 46 by a pair of flanges 51 formed on the probe 42. A microswitch 52 is rigidly attached to the arm 47 in axial alignment with probe 42. Thus, as the probe 42 is moved by the air cylinder 43 to the left as viewed in FIG. 2, it moves relative to the yoke 44 upon engagement with a resistor 15 and contacts the microswitch 52.

Subjacent the yoke 44 is an additional air cylinder 53 for reciprocating a pair of parallel voltage probes 54 rigidly secured to an insulating member 56. A push rod 57 is rigidly connected to the insulating member 56 and protrudes the voltage probes 54 into the interior of the tube 31 by means of the air cylinder 53. Aligned with the voltage probes 54 and protruding into the tube 31 diametrically opposite the protuberance of the probes 54 into the tube 31 are a pair of parallel current probes 58. A spacer block 59 of insulating material to which are rigidly attached the current probes 58 secures a horizontal pin 61 having a pair of spiral springs 62 concentric therewith. Situated between the springs 62 and in slidable engagement with the pin 61 is one arm 63 of an inverted U-shaped yoke 64. A microswitch 66 is rigidly affixed to the other arm 67 of the yoke 64 in axial alignment with the pin 61. The yoke is reciprocated by an air cylinder 68 through a piston rod 69 which forms a portion of the air cylinder. Thus, as in the case of the microswitch 52, when the probes 58 engage a resistor 15 within the tube 31, the springs 62 will be distorted and the microswitch 66 engaged by the pin 61.

Vertically spaced below the yoke 64 is another air cylinder 71 which reciprocates, by means of a push rod 72, a slidable rod 73, the end of which is designed to be moved into and out of the interior of the vertically extending tube 31 to form a stop for the resistors therein. A similar rod 74 is located immediately below and to the right of the rod 73 as viewed in FIG. 2 and forms an alternate stop when resistors of a different size are being tested. This rod is similarly reciprocated through a push rod 76 by an air cylinder 77. Attached to the bottom of the base 18 beneath the plastic block 17 is an air cylinder 78 which reciprocates a slidable member 79 having vertical apertures 81 and 82 therein and a pair of flexible tubes 83 and 84 rigidly affixed thereto. The outlet tube 84 may lead to a reject container while the other outlet tube 83 may lead to a utilizing station such as a position in a resistor manufacturing line.

Figure 3:
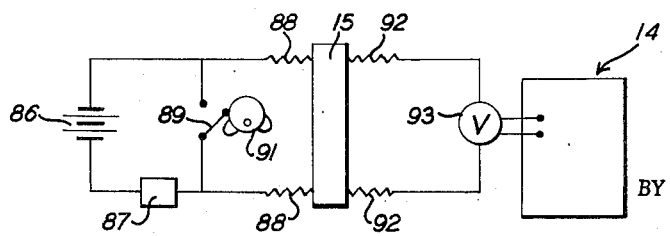
FIG. 3 is a schematic diagram of a resistance testing circuit employed in the apparatus shown in FIG. 2.

An arrangement of circuitry connected to the current probes 58 and voltage probes 54 is diagrammatically shown in FIG. 3 wherein a source of direct current 86 is connected in series with a constant current regulator 87, a pair of contact resistances 88, and the resistor 15 being tested. A shorting circuit through the switch 89 may be closed by a cam 91 during the time that the current probes 58 are approaching or being disengaged from the resistor 15 to prevent arcing therebetween. On the opposite side of the resistor 15 is a shunt circuit having therein contact resistances 92 and a high impedance voltmeter 93, which is electrically connected to the computer 14. Inasmuch as the contact resistances 88 are are not in the shunt circuit to the voltmeter 93, the reading on the voltmeter will closely approach the actual value of voltage drop across the resistor 15 because the extremely high impedance of the voltmeter will reduce the effect of the contact resistances 92 to a negligible amount. Inasmuch as the current in the probes 58 is maintained at a constant level by the current regulator 87, the actual resistance value is transmitted from the voltmeter 93 to the computer 14 which will then position the slidable member 79 in a reject or accept position on the basis of the resistance value thus obtained.

*Operation*

The electrical control circuitry 13 and pneumatic controls 12 mentioned above, by which the actuation of the air cylinders shown in FIGS. 1 and 2 is accomplished, can best be understood when described in conjunction with the operation of the resistance testing device 11.

Referring now to FIG. 1, and assuming that a series of resistors 15 of a particular size are to be tested, the testing device 11 will be preconditioned by the computer 14 to accommodate this size resistor. Preconditioning of the electrical control circuitry 13 is accomplished by means of a two-position switch 94 operated by a relay coil 96 which is connected to the computer 14. Hence, as shown in FIG. 1, a solenoid valve 97 is actuated by a current source 98 whereby compressed air is transmitted to the air cylinder 71 at such time as the air is allowed to pass to the solenoid valve 97.

A series of coated resistors 15 of the size for which the apparatus has been conditioned is fed to the testing device 11 through the tube 26. Assuming these resistors are transmitted to the device at a faster rate than the device is capable of testing, they will fill the tube 31 and break the light beam in the photoelectric cell 33. When this beam is broken for an appreciable time a circuit from the current source 98 through a spring return solenoid valve 99 is opened by a time delay relay 100. At this time a spring (not shown) within the spring return solenoid valve 99 will move the valve to connect the air cylinder 21 with a source of compressed air 101 whereby the air cylinder is actuated to align the tube 26 with the overflow tube 29. Subsequently, when the level of the resistors 15 within the tube 31 falls below the light beam of the photoelectric tube 33, the circuit through the solenoid valve 99 will be reestablished whereby the slidable block 23 is returned to its normal position as shown in FIG. 1.

Assuming, however, that the elements are in the position shown in FIG. 1, a resistor 15 will be held by the elongated rod 39. When the computer 14 signals for a resistor to be tested, a circuit is established between a motor 102 from a voltage source 103 through a relay switch 104, which is momentarily closed by the computer. As the motor 102 starts operating, a cam shaft 106 driven thereby rotates a cam 107 whereupon a switch 108 is actuated so as to maintain the circuit closed between the voltage source 103 and the electric motor 102 when the computer 14 opens the relay switch 104 by suitable impulses. Continued rotation of the cam shaft 106 will result in a cam 109 momentarily closing a mechanical valve 111 which connects the air cylinder 34 to the source of compressed air 101. This causes the upper end of the vertical member 37 to be reciprocated in a forward and backward store to release a resistor 15 from retention by the rods 39 and 41.

Simultaneously with the closing of the valve 111, a mechanical valve 112 (FIG. 1) will be closed by a cam 113 to connect the compressed air source 101 to solenoid valves 97 and 114. However, as previously described, the solenoid valve 97 will have been opened by the computer 14 to pass compressed air to the air cylinder 71 to thereby extend the probe 73. Thus, the resistor 15, previously released by the rods 39 and 41, drops to the extended probe 73 and is supported thereon. When this condition is reached, a mechanical valve 116 is opened by the cam 117 to actuate the air cylinders 43, 53, and 68. As the probe 42, which is actuated by the air cylinder 43, enters the aperture 32, it should not encounter a resistor if the operation is functioning properly. If, however, through some malfunction a resistor is contacted by the probe 42, the microswitch 52 will be closed to signal the computer 14 of this fact via a conductor 118. The computer 14 at that time opens a solenoid valve 119 to move the apertured block 79 to the left to a reject position. Similarly, when the current probes 58 approach the aperture 32 and do not contact a resistor, the microswitch 66 remains open and an indicative signal output is sent to the computer 14 via the conductor 120. Should this happen, the computer opens the solenoid valve 119 which will actuate the air cylinder 78 to move the block 79 to the reject position.

Assuming no malfunction has occurred, the valve 112 is opened by the cam 113 to retract the rod 73 and leave the resistor to be contactingly held by the current probes 58 and voltage probes 54. While the probes are in contact with resistor 15, the voltage drop across the resistor is transmitted to the high impedance voltmeter 93 (FIG. 3) via conductors 121 and thence to the computer 14. The computer then conditions the solenoid valve 119 to index the apertured block 79 in either a reject or accept position depending upon the magnitude of the resistance previously determined. Subsequently, the mechanical valve 116 is closed by the cam 117 to retract the elements controlled thereby and allow the tested resistor 15 to pass out of the machine through the previously positioned block 79. At this time the cam 107 opens the switch 108 to stop the motor 102. The device 11 is then ready for recycling. It should be noted that as the current probes 53 are approaching and being disengaged from the previously positioned resistor 15, the cam 91 closes the switch 89 (FIGS. 1 and 3) to place a short in the constant current supply circuit to prevent arcing between the probes and the resistor.

Although the invention has been described with reference to a particular embodiment, it is to be understood that various modifications may be made without departing from the spirit and scope of the invention.

What is claimed is:

1. In combination with a computer, a support, gating means mounted on the support and connected to be operated by said computer for admitting an electrical component to the interior of the support in response to a signal from the computer, testing means operatively connected to the computer mounted on the support for releasably engaging an electrical component, a testing circuit including the testing means for determining the value of an electrical characteristic of an electrical component and transmitting the value to the computer, means including said testing means for sensing the presence of a resistor in a test position, and means mounted on the support for segregating the electrical components in response to a variable signal from the computer, said signal being varied by the value of the electrical characteristic previously transmitted to the computer and in response to a signal from the sensing means.

2. In combination with a computer, a holder having an aperture therein, gating means controlled by the computer mounted on the holder for releasably engaging an electrical component in the aperture, means mounted on the holder for positioning the previously engaged electrical component in response to a signal from the computer, testing probes mounted within the holder for releasably holding the electrical component during testing, a testing circuit including the testing probes for determining the resistance value of the electrical component and for transmitting the value to the computer, an apertured outlet block, and means mounted in a predetermined relationship to the holder for aligning a selected aperture in the block with the aperture within the holder in response to a variable signal from the computer, said signal being indicative of the resistance value previously transmitted to the computer.

3. In combination with a computer, a holder having an aperture therein, feed means for presenting to the aperture a continuous supply of electrical components, means mounted on the holder for moving the feed means into and out of alignment with the aperture in the holder, a gating means mounted on the holder for releasing an electrical component within the aperture in response to a signal from the computer, a movable stop mounted in the holder for positioning the previously admitted electrical component in the aperture in response to a signal from the computer, testing probes mounted in the holder for releasably engaging the thus positioned electrical component during testing, a testing circuit including the probes for determining the resistance value of the component and for transmitting such value to the computer, means mounted on the holder and connected to said computer for sensing the position of the component in the holder and signaling the computer in response to the position sensed, an apertured outlet block mounted on the holder, and means mounted in a predetermined relationship to the holder for aligning a selected aperture in the outlet block with the aperture in the holder in response to a variable impulse from the computer, said impulse being indicative of signals transmitted to the computer from the position sensing means and the testing circuit.

4. In combination with a computer; a holder having a vertical aperture extending therethrough, feed means for presenting to the aperture a continuous single file supply of electrical components, a photoelectric cell arranged to project a beam of light through the supply, a slidable block controlled by the photoelectric cell for placing the feed means into and out of alignment with the vertical aperture in the holder, gating means mounted on the holder which includes a pair of laterally extending rods alternately movable into the vertical aperture to feed electrical components singly therein in response to a signal from the computer, a movable stop mounted in the holder for positioning the previously fed electrical components in the vertical aperture in response to a signal from the computer; testing probes mounted in the holder for releasably engaging the thus positioned electrical component during testing, a testing circuit including the testing probes for determining the resistance value of the electrical component being tested and for transmitting such value to the computer, a sensing probe mounted in the holder for sensing the position of a resistor in the holder and signaling the computer in response to the position sensed, an apertured block mounted in a predetermined relationship to the holder for aligning an aperture in the block with the aperture in the holder in response to a variable impulse from the computer, said impulse being indicative of signals transmitted to the computer.

5. A resistance checking device which comprises a holder having an aperture extending therethrough, feed means for presenting to the aperture a continuous single file supply of electrical components, gating means mounted on the holder which includes a pair of laterally extending rods alternately movable into the aperture to feed electrical components singly therein, a movable stop mounted in the holder for positioning the electrical components in the aperture, a plurality of testing probes rendered effective upon movement of said stop mounted in the holder for releasably holding the thus positioned electrical components during testing, a testing circuit including the testing probes for determining the resistance value of the electrical component being tested, a sensing probe mounted in the holder for sensing the position of a resistor in the holder, a slidable block having a plurality of outlets therein mounted in a predetermined relationship to the holder, and means for aligning one of the outlets in the slidable block with the aperture in the holder in response to the resistance value determined by the testing circuitry and the position of the component determined by the sensing probes.

6. In an apparatus for testing a resistor, a chute having an inlet and outlet for receiving a resistor, a rod, means for moving said rod into said chute to support a resistor in the chute, a slide having an accept aperture and a reject aperture, means for selectively moving said slide to position either said accept or reject aperture in alignment with the outlet of said chute, a probe, means for moving said probe into said chute, and means actuated by said probe encountering a resistor for operating said selectively moving means to move said slide to position said reject aperture in alignment with said lower terminus of the chute.

7. In an apparatus for testing a resistor, a chute having an inlet and outlet for receiving a resistor, a rod movable into said chute for temporarily supporting a resistor therein, a slide having accept and reject apertures therein, means for selectively moving said slide to position either said accept or said reject aperture in alignment with the outlet of said chute, a plurality of probes for engaging and holding a resistor in said chute, means for moving said probes into said chute, means rendered effective upon movement of said probes into said chute for withdrawing said rod therefrom, and means actuated upon said probes not encountering a resistor for operating said selectively moving means to move said slide to position said reject aperture in alignment with said chute outlet.

8. In an apparatus for testing a resistor, a chute having an inlet and outlet for receiving a resistor, a rod movable into said chute for temporarily supporting a resistor therein, a slide having accept and reject apertures therein, means for selectively moving said slide to position either of said apertures in alignment with the outlet of said chute, a plurality of probes for engaging and holding a resistor in said chute, means rendered effective upon movement of said probes into said chute for withdrawing said rod therefrom, means including said probes for measuring the resistance value of said resistor, and means actuated upon said measuring means determining an unacceptable resistance value for operating said selectively moving means to move said slide to position said reject aperture in alignment with said chute outlet.

9. In an apparatus for testing a resistor, a chute having an inlet and outlet for receiving a resistor, a rod movable into said chute for temporarily supporting a resistor therein, a rod, means for moving said rod into said chute to temporarily support a resistor in the chute, a slide having accept and reject apertures, means for selectively moving said slide to position one of said apertures in alignment with the outlet of said chute, a first probe, means for moving said first probe into said chute, a plurality of second probes for engaging and holding a resistor in said chute, means for moving said second probes into said chute, means rendered effective upon movement of said probes into said chute for withdrawing said rod, and means actuated upon said first probe encountering a resistor and upon said second probes not encountering a resistor for operating said selectively moving means to move said slide to position said reject aperture in alignment with said chute outlet.

10. In an apparatus for testing components, a chute, shiftable means for supplying components to said chute, an escapement projecting into said chute for retaining said components within the chute, means for cyclically operating said escapement to release said components seriatim, a first rod spaced from said escapement and mounted for movement into said chute to support each released component, a second rod spaced from said escapement and said first rod and mounted for movement into said chute to support each released component, selectively operable means rendered effective prior to each operation of the escapement for moving said first or second rod into said chute, a probe interposed between said escapement and said rods and mounted for movement into said chute, means rendered effective upon a component being released onto one of said rods for moving said probe into said chute, a block having an accept aperture and a reject aperture, means for slidably mounting said block to position the accept aperture in alignment with the chute, means responsive to said probe encountering a component for sliding said block to position the reject aperture in alignment with said chute, means rendered effective following each movement of the probe into the chute for withdrawing said first or second rod to permit the component to fall through the aligned aperture, and means responsive to the retention of components in said chute for a predetermined time for shifting said supply means to preclude the further supply of components to said chute.

References Cited in the file of this patent

UNITED STATES PATENTS

| | | |
|---|---|---|
| 2,045,769 | Geffcken | June 30, 1936 |
| 2,448,652 | Aller | Sept. 7, 1948 |
| 2,566,767 | Hunt | Sept. 4, 1951 |
| 2,647,628 | Diamond | Aug. 4, 1953 |
| 2,659,861 | Branson | Nov. 17, 1953 |
| 2,762,015 | McGrath | Sept. 4, 1956 |
| 2,803,341 | Schneider | Aug. 20, 1957 |
| 2,860,778 | Becker | Nov. 18, 1958 |